United States Patent [19]

Itabashi

[11] Patent Number: 5,031,979
[45] Date of Patent: Jul. 16, 1991

[54] F θ LENS SYSTEM IN OPTICAL SCANNER

[75] Inventor: Akihisa Itabashi, Mitaka, Japan

[73] Assignee: Ricoh Company, Ltd., Tokyo, Japan

[21] Appl. No.: 447,859

[22] Filed: Dec. 8, 1989

[30] Foreign Application Priority Data

Dec. 13, 1988 [JP] Japan .................. 63-314558

[51] Int. Cl.$^5$ .................. G02B 26/08; G02B 3/04
[52] U.S. Cl. .................. 350/6.8; 350/6.7; 350/433; 350/434
[58] Field of Search .................. 350/6.8, 6.1–6.7, 350/415, 420, 433–434; 358/300; 250/334–336

[56] References Cited

U.S. PATENT DOCUMENTS 4,836,630  6/1989  Takanashi .................. 350/6.1
4,919,502  4/1990  Yamakawa .................. 350/6.8

FOREIGN PATENT DOCUMENTS 147316  8/1984  Japan .
120112  6/1986  Japan .

Primary Examiner—Bruce Y. Arnold
Assistant Examiner—James Phan
Attorney, Agent, or Firm—Oblon, Spivak, McClelland, Maier & Neustadt

[57] ABSTRACT

In an f θ lens system in an optical scanner, a light beam from a light source is formed as a line image extending in a main scanning corresponding direction and is deflected at an equal angular velocity by a rotary polygon mirror having a reflecting face in the vicinity of an image forming position of the line image. The f θ lens system focuses and forms the light beam deflected by the rotary polygon mirror as an image on the scanned face and comprises a functional device having a function for connecting a reflecting position of the rotary polygon mirror and the scanned face in an approximately conjugate relation with respect to a secondary scanning direction, and an f θ function for moving the deflected scanning light beam on a scanned medium face at an approximately equal speed with respect to a main scanning direction; and two groups of first and second lenses sequentially arranged from the side of the rotary polygon mirror toward the scanned face side. A lateral magnification of the formed image on the scanned face with respect to the linear image in the secondary scanning direction is provided in a range of −9.15 to −2.20. The lenses have first to fourth lens faces having shapes on a deflecting plane respectively composed of a straight line, an arc, an arc and an arc. The first and second lenses have a positive refracting power on a plane parallel to the deflecting plane.

4 Claims, 16 Drawing Sheets

Fig. 1a (i)　　　　Fig. 1a (ii)
MAIN　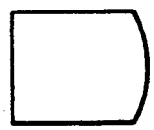　　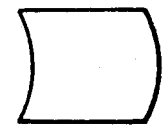
(凸)　　　　　　(凸)
CONVEX　　　　CONVEX
SECONDARY　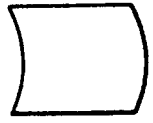　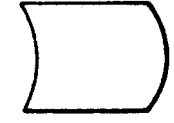
(凹)　　　　　　(凸)
CONCAVE　　　CONCAVE
Fig. 1a (iii)　　　Fig. 1a (iv)
Fig. 1b (i)　　　　Fig. 1b (ii)
MAIN　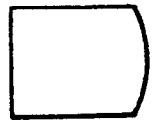　　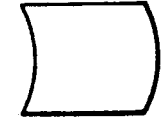
(凸)　　　　　　(凸)
SECONDARY　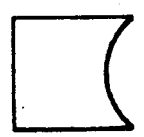　
(凹)　　　　　　(凸)
Fig. 1b (iii)　　　Fig. 1b (iv)

MAIN 
(△)

SECONDARY 
(ப)

Fig. 1c(iii)  Fig. 1c(iv)

MAIN 
(△)

SECONDARY 
(ப)

Fig. 1d(iii)  Fig. 1d(iv)

MAIN 
(△)

SECONDARY 
(ப)

Fig. 1e(iii)  Fig. 1e(iv)

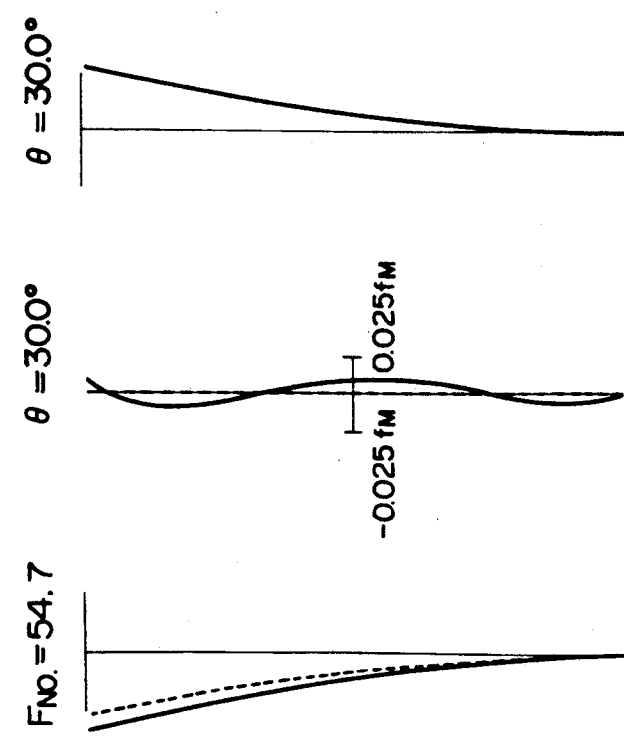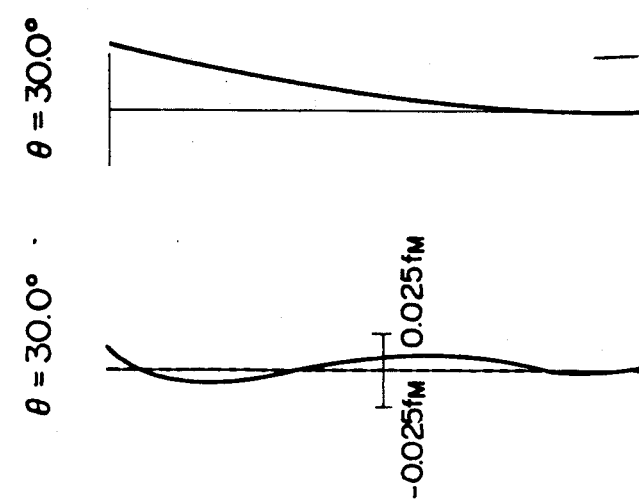

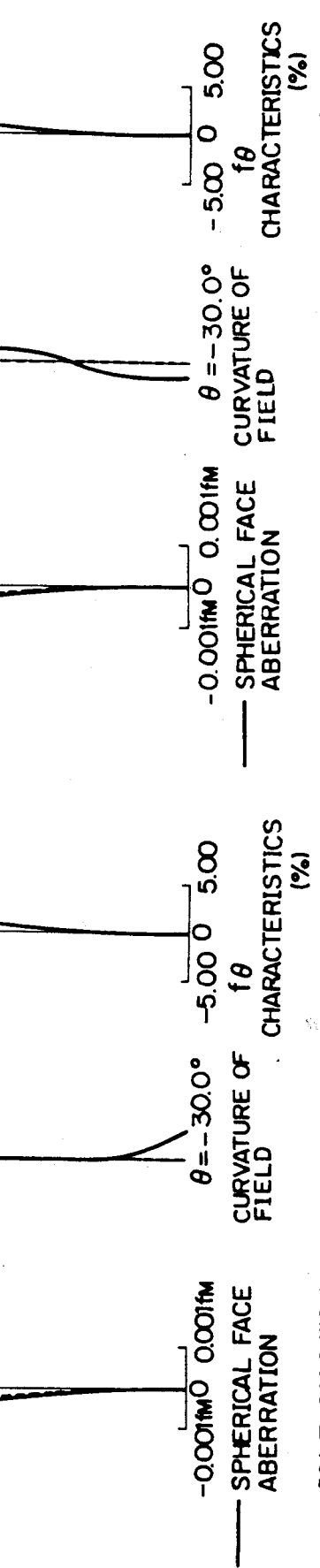

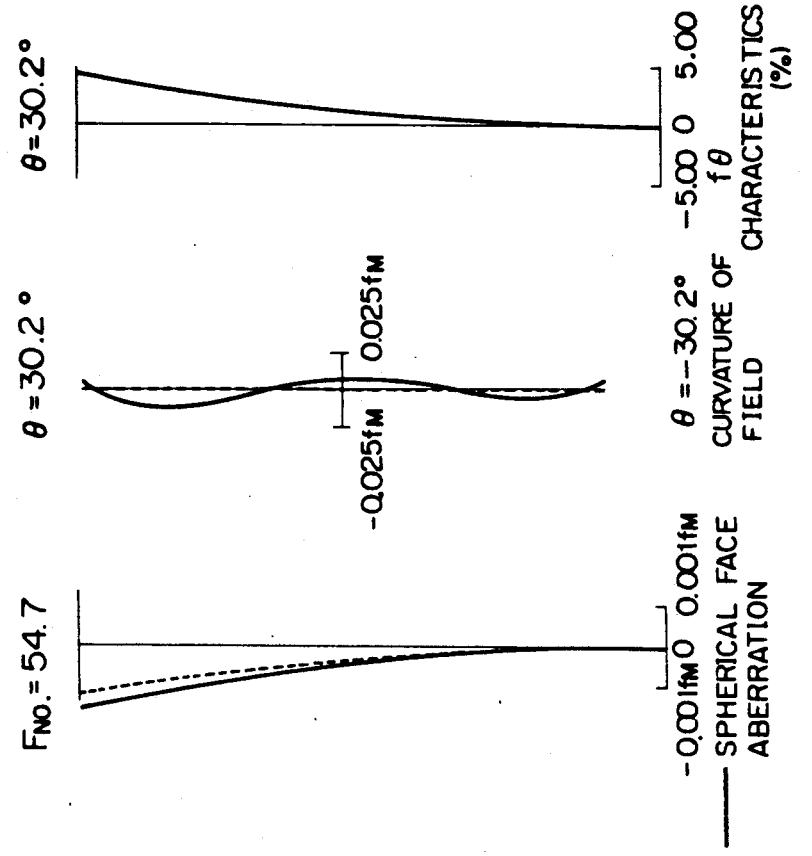
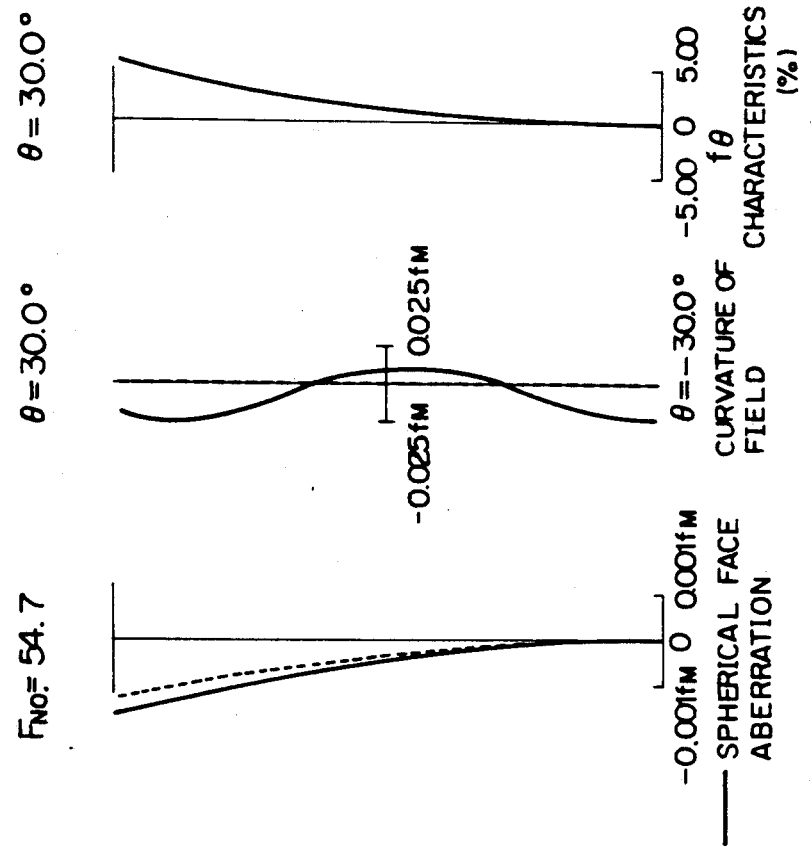

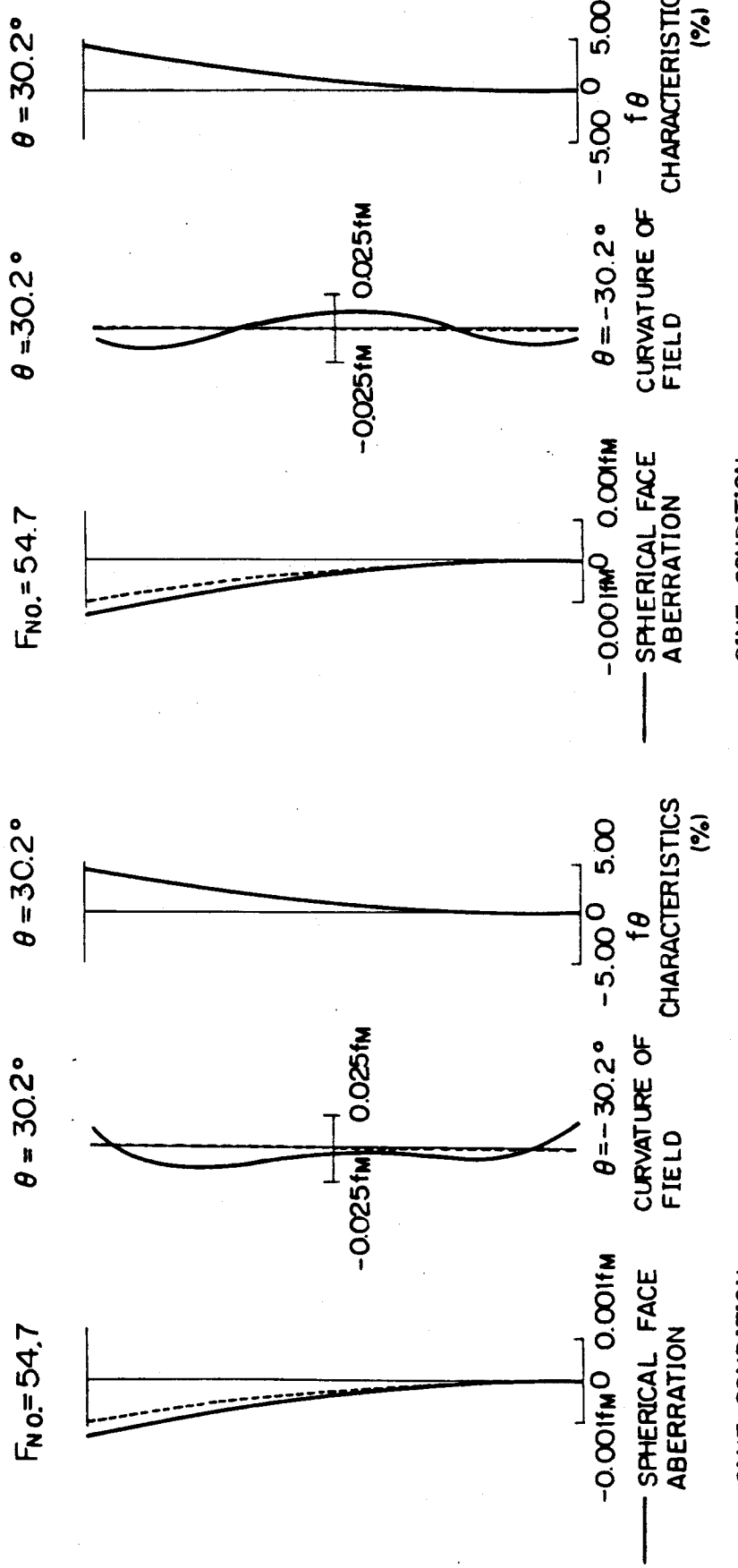

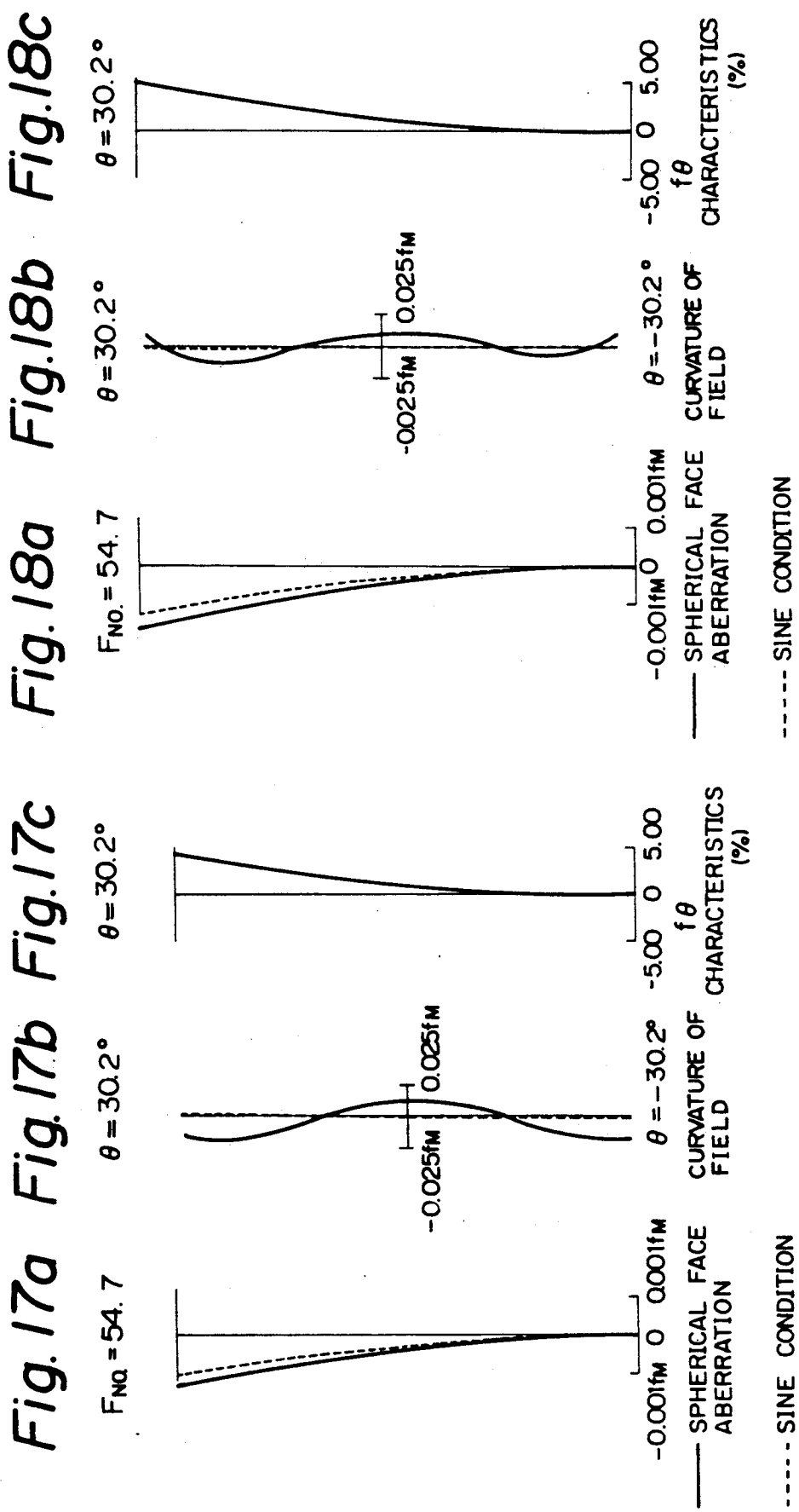

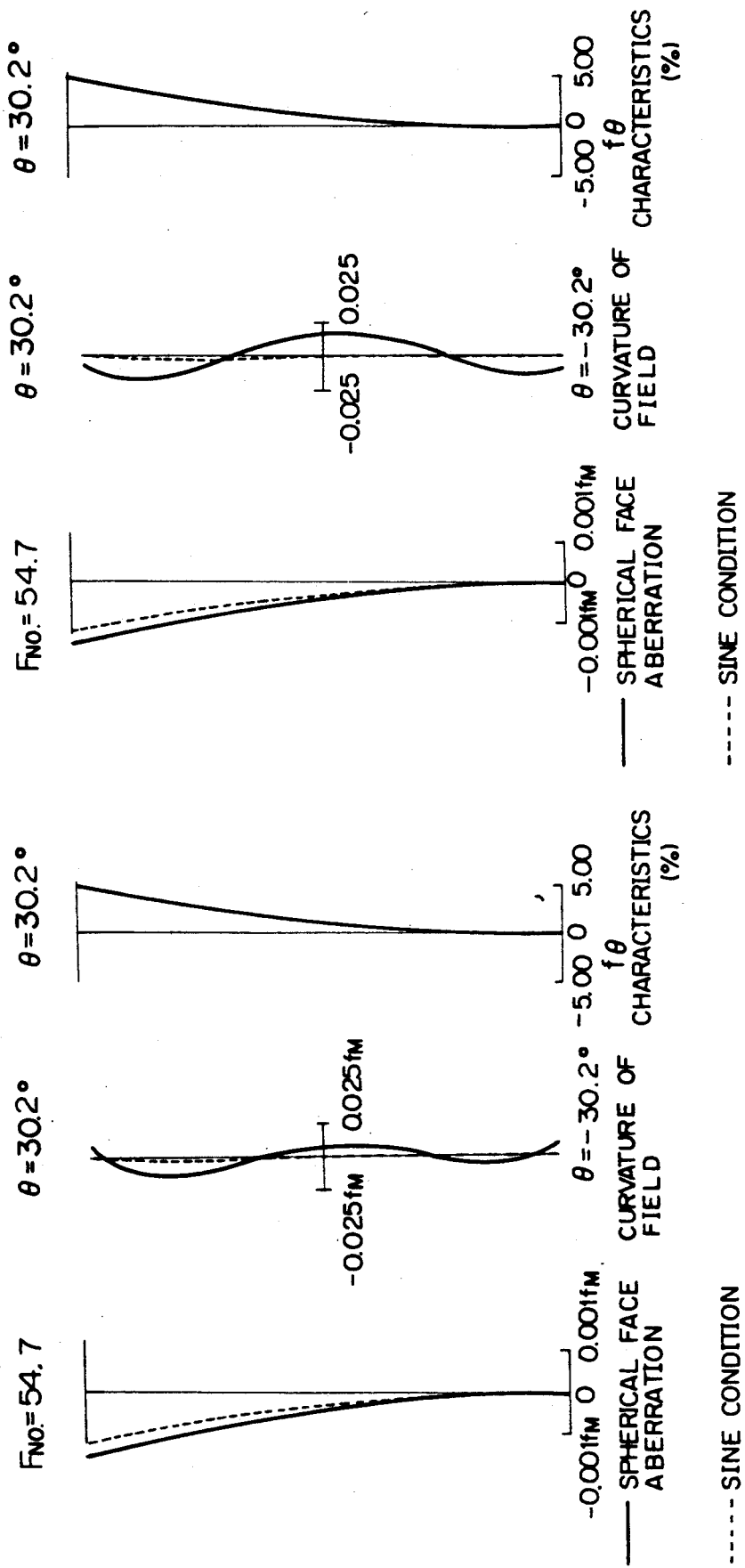

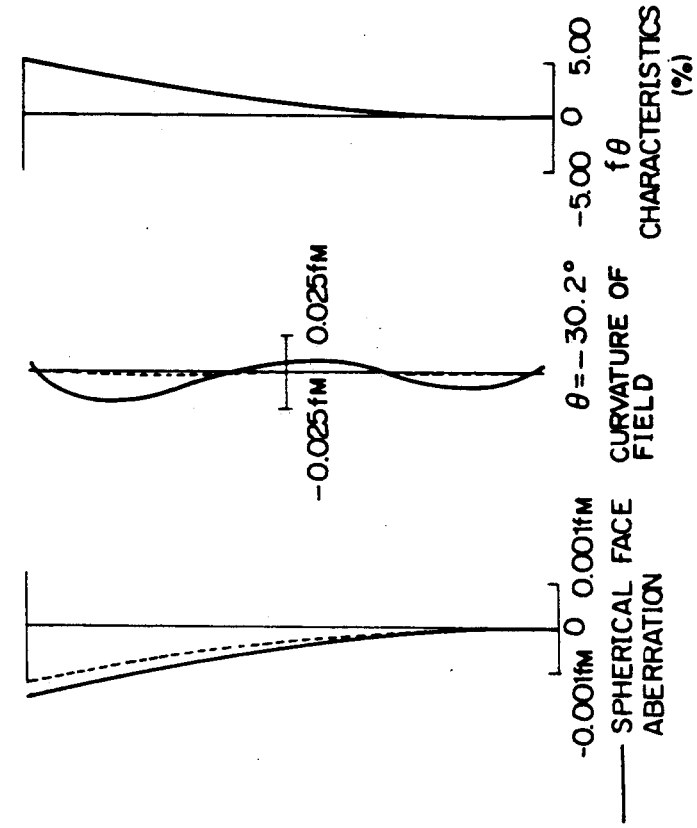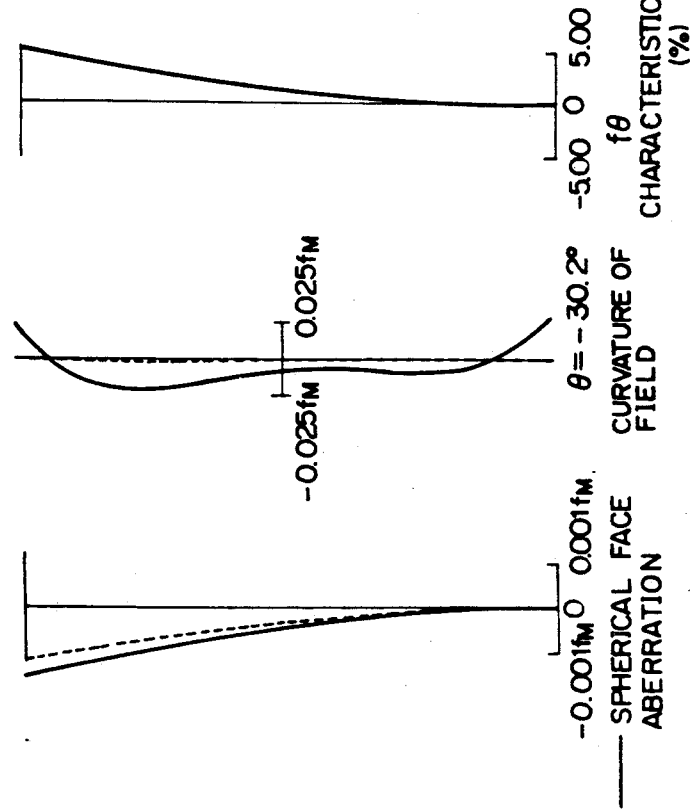

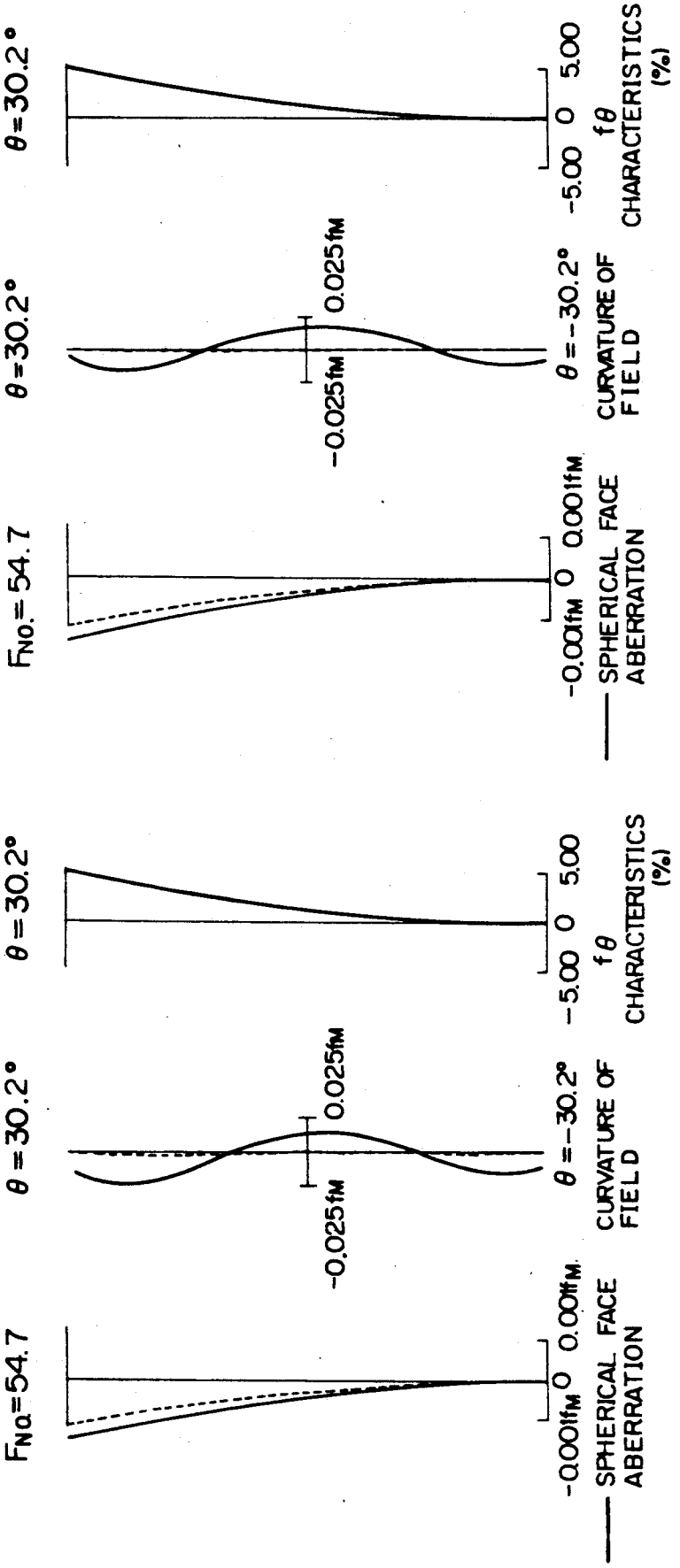

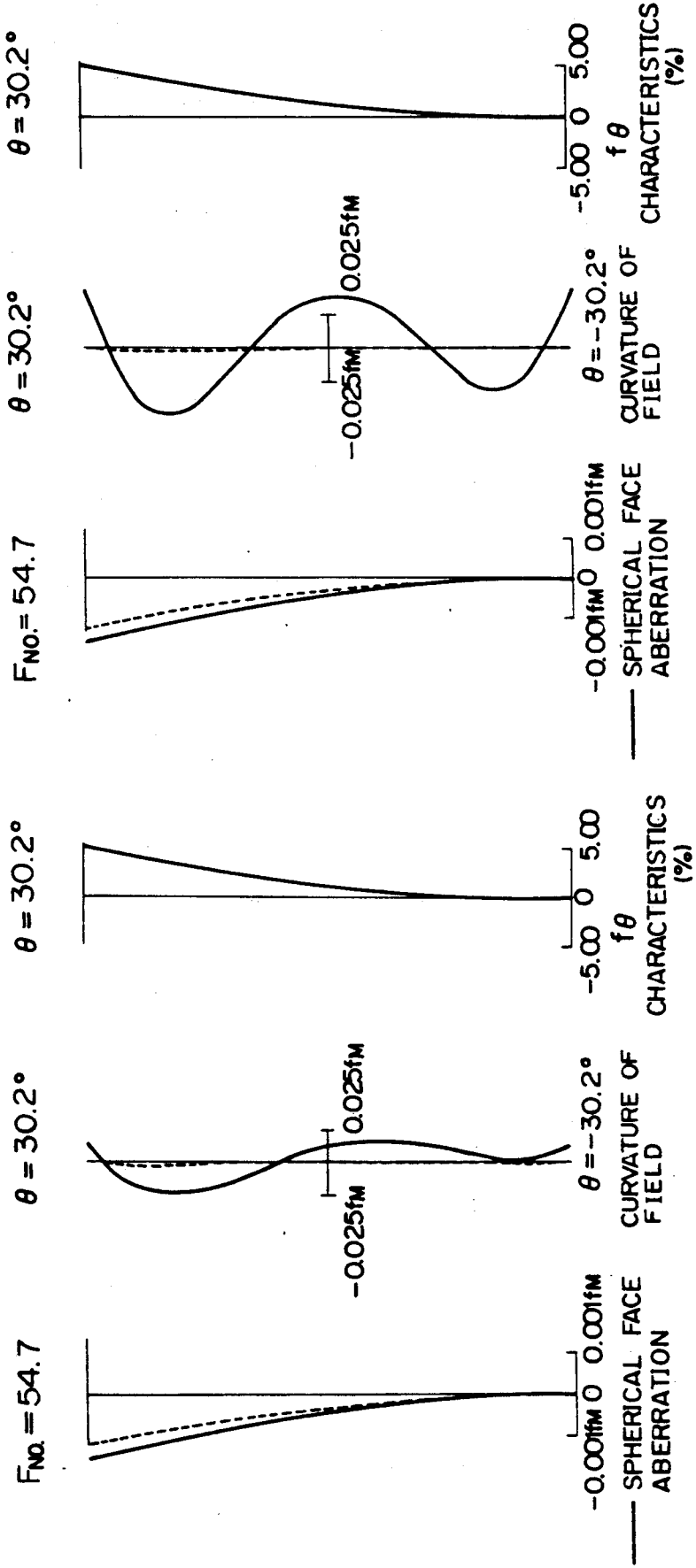

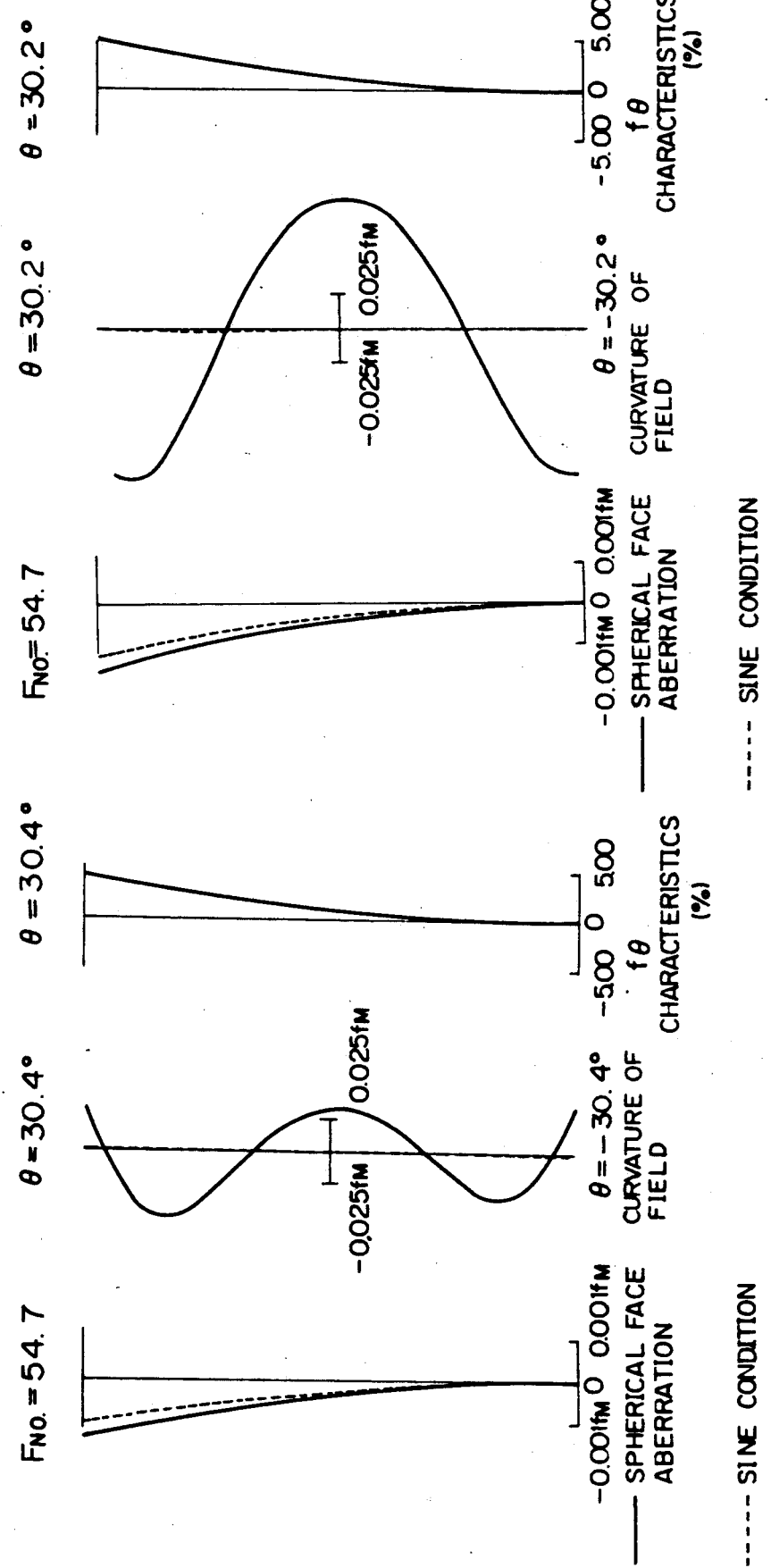

F θ LENS SYSTEM IN OPTICAL SCANNER

BACKGROUND OF THE INVENTION

The present invention relates to an fθ lens system in an optical scanner using a rotary polygon mirror.

An optical scanner is known as a device for writing and reading information by scanning a light beam and is used in a laser printer, a facsimile, etc. In such an optical scanner, there is a device having an optically scanning system in which the light beam from a light source is focused and formed as a line image extending in a main scanning corresponding direction and this light beam is deflected at an equal angular velocity by a rotary polygon mirror having a reflecting face in the vicinity of an image forming position of the line image. In this system, the deflected light beam is further focused and formed on a scanned face in the shape of a spot by an image forming lens system to optically scan the scanned face.

In the optical scanner using the rotary polygon mirror, there is a problem about the inclination of the reflecting face. Further, with respect to the deflected light beam, since the angular velocity of a deflector is constant, the scanned face is not scanned at a constant speed so that it is necessary to take measures for performing the scanning operation at the constant speed. An fθ lens system is a lens system for optically realizing the scanning operation of the scanned face at the constant speed. This lens system has an fθ function in which the height of an image formed by the incident light beam becomes fθ when an angle between the incident light beam and a lens optical axis is θ and the focal distance of the lens is f.

As a method for solving the problem of the reflecting face inclination, there is a known method in which a lens system disposed between the rotary polygon mirror and the scanned face is set to an anamorphic optical system, and a reflecting position of the rotary polygon mirror and the scanned face are connected to each other in a conjugate relation with respect to a secondary scanning direction.

Japanese Patent Application Laying Open (KOKAI) No. 59-147316 discloses an fθ lens system set as the anamorphic optical system to solve the problems about the scanning operation at a constant speed and the inclination of the reflecting face. This lens system has a large deflecting angle, but it is not necessarily sufficient to correct a curvature of a field in the main and secondary scanning directions. Further, the diameter of an image forming spot on the scanned face is greatly varied depending on the scanning position so that it is difficult to realize the optical scanning operation of high density.

SUMMARY OF THE INVENTION

It is therefore an object of the present invention to provide a novel fθ lens system in an optical scanner for sufficiently correcting the curvature of the field in the main and secondary scanning directions and solving the problems about the inclination of a reflecting face in the rotary polygon mirror.

The above object of the present invention can be achieved by an fθ lens system in an optical scanner in which a light beam from a light source is formed as a line image extending in a main scanning corresponding direction and is deflected at an equal angular velocity by a rotary polygon mirror having a reflecting face in the vicinity of an image forming position of the line image and is then formed by an image forming lens system in the shape of a spot on a scanned face to optically scan the scanned face. The fθ lens system focuses and forms the light beam deflected by the rotary polygon mirror as an image on the scanned face. The fθ lens system comprises functional means having a function for connecting a reflecting position of the rotary polygon mirror and the scanned face in an approximately conjugate relation with respect to a secondary scanning direction, and an fθ function for moving the deflected scanning light beam on a scanned medium face at an approximately equal speed with respect to a main scanning direction; and two groups of first and second lenses sequentially arranged from the side of the rotary polygon mirror toward the scanned face side. A lateral magnification of the formed image on the scanned face with respect to the line image in the secondary scanning direction is provided in a range of $-9.15$ to $-2.20$. The lenses have first to fourth lens faces provided from the side of the rotary polygon mirror and having shapes on a deflecting plane sequentially composed of a straight line, an arc, an arc and an arc from the first to fourth lens faces. The first and second lenses have a positive refracting power on a plane parallel to the deflecting plane.

Further objects and advantages of the present invention will be apparent from the following description of the preferred embodiments of the present invention as illustrated in the accompanying drawings.

BRIEF DESCRIPTION OF THE DRAWINGS

FIGS. 9 to 28 are aberration diagrams, diagrams showing curvatures of fields and graphs of fθ characteristics sequentially described with respect to embodiments 1 to 20 of the present invention.

DESCRIPTION OF THE PREFERRED EMBODIMENTS

Figure 1C:
FIG. 1 is a view for explaining a lens shape of an fθ lens system of the present invention.
Figure 1C:
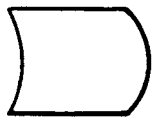
Figure 1C:
Figure 1C:

The preferred embodiments of an fθ lens system in an optical scanner of the present invention will now be described in detail with reference to the accompanying drawings.

In the present invention, four kinds of fθ lens systems are proposed.

With respect to these four kinds of fθ lens systems, in an optical scanner, a light beam from a light source is focused and formed as a line image and this light beam is deflected at an equal angular velocity by a rotary polygon mirror having a reflecting face in the vicinity of an image forming position of the linear image. This deflected light beam is focused and formed in the shape of a spot on a scanned face by an image forming lens system to optically scan the scanned face. The above four kinds of fθ lens systems are lens systems for focusing and forming the light beam deflected by the rotary polygon mirror as an image on the scanned face in the optical scanner. The four kinds of fθ lens systems have a function for connecting a reflecting position of the rotary polygon mirror and the scanned face in a conjugate relation with respect to a secondary scanning direction, and an fθ function.

The four kinds of fθ lens systems are respectively constructed by two groups of first and second lenses sequentially arranged from the side of the rotary polygon mirror toward the scanned face side. Further, in these four kinds of fθ lens systems, a lateral magnification β of the formed image on the scanned face with respect to the above line image is provided in the following range, $$-9.15 < \beta < -2.20 \tag{I}$$

with respect to the secondary scanning direction. Further, in these four kinds of fθ lens systems, when the respective lens faces are set from first to fourth faces arranged from the side of the above rotary polygon mirror, these lens faces on a deflecting plane sequentially have the shapes of a straight line, an arc, an arc and an arc from the first face toward the fourth face. On a plane parallel to the deflecting plane, both the above first and second lenses have a positive refracting power. Further, a toric face having a large curvature on the deflecting perpendicular plane is included on the four lens faces. The four kinds of fθ lens systems commonly have the above construction.

With respect to a first fθ lens system, in addition to the above common features, the first face is a concave cylindrical face having the refracting power on only the deflecting perpendicular plane, the second face is a convex spherical face, the third face is a concave spherical face, and the fourth face is a toric face having a large curvature on the deflecting perpendicular plane.

When a combined focal distance on the deflecting perpendicular plane is set to $f_S$ and the radius of curvature of the above first face on the deflecting perpendicular plane is set to $r'_1$, the following condition with respect to the $r'_1$ and the $f_S$ is satisfied.

$$0.23 \leq |r'_1/f_S| \leq 1.88 \tag{1-II}$$

With respect to a second fθ lens system, in addition to the above common features, the first face is a planar face, the second face a toric face having a large curvature on the deflecting perpendicular plane, the third face a concave spherical face, and the fourth face is a toric face having a large curvature on the deflecting perpendicular plane.

When a combined focal distance on the deflecting perpendicular plane is set to $f_S$ and the radii of curvature of the above second and third faces on the deflecting perpendicular plane are respectively set to $r'_2$ and $r'_3$, the following condition with respect to these values is satisfied.

$$0.08 \leq |\{(1/r'_2) + (1/r'_3)\} \cdot f_S| \leq 0.18 \tag{2-II}$$

With respect to a third fθ lens system, in addition to the above common features, the first face is a concave cylindrical face having the refracting power on only the deflecting perpendicular plane, the second face a toric face having a large curvature on the deflecting perpendicular plane, the third face a concave spherical face, and the fourth face is a toric face having a large curvature on the deflecting perpendicular plane.

When a combined focal distance on the deflecting perpendicular plane is set to $f_S$ and the radii of curvature of the above first and second faces on the deflecting perpendicular plane are respectively set to $r'_1$ and $r'_2$, the following conditions with respect to these values are satisfied.

$$0.05 \leq |r'_1/f_S| \leq 1.46 \tag{3-II}$$

$$0.3 \leq |r'_2/f_S| \leq 58.3 \tag{3-III}$$

Further, with respect to a fourth fθ lens system, in addition to the above common features, the first face is a planar face, the second face a toric face having a large curvature on the deflecting perpendicular plane, the third face a toric face having a large curvature on the deflecting perpendicular plane, and the fourth face is a convex spherical face.

When the radius of curvature of the above third face on the deflecting perpendicular plane is set to $r'_3$ and the distance between the first and second lenses is set to $d_2$, the following condition with respect to these values is satisfied.

$$4.2 \leq |r'_3/d_2| \leq 9.03 \tag{4-II}$$

As mentioned above, one of the features of the fθ lens system in the present invention resides in the combinations of the first to fourth face shapes.

Namely, in the first fθ lens system, with respect to the combination of the first to fourth faces, the first face is the concave cylindrical face, the second face the convex spherical face, the third face the concave spherical face and the fourth face is the toric face.

In the second fθ lens system, the first face is the planar face, the second face the toric face, the third face the concave spherical face and the fourth face is the toric face.

In the third fθ lens system, the first face is the concave cylindrical face, the second face the toric face, the third face the concave spherical face and the fourth face is the toric face.

In the fourth fθ lens system, the first face is the planar face, the second face the toric face, the third face the toric face and the fourth face is the convex spherical face.

The respective lens faces of the fθ lens systems will next be described with reference to FIGS. 1a to 1e. In each of these FIGS. 1a to 1e, the left-hand side is the side of the rotary polygon mirror and the right-hand side is the side of the scanned face. Accordingly, with respect to the lenses, the first lens is located on the left-hand side and the second lens is located on the right-hand side. The first to fourth lens faces are sequentially represented from the left toward the right. The upper side views of the respective FIGS. 1a to 1e show lens shapes of the fθ lens systems on the deflecting plane and the lower side views thereof show lens shapes on the deflecting perpendicular plane.

Here, "the deflecting plane" is a plane formed by the light beam on an optical axis ideally deflected by the rotary polygon mirror. "The deflecting perpendicular plane" is a plane passing through an optical axis of the fθ lens system and perpendicular to the above deflecting plane. The deflecting plane corresponds to an intersection line crossing the scanned face thereof or an ideal main scanning direction. Therefore, the upper views of the respective FIGS. 1a to 1e are shown as "main". Similarly, the deflecting perpendicular plane corresponds to the secondary scanning direction and therefore the lower views of the respective FIGS. 1a to 1e are shown as "secondary".

In the first to fourth fθ lens systems, as the common features, the first to fourth lens faces on the deflecting plane sequentially have the shapes of a straight line, an arc, an arc and an arc as shown by the upper views of the respective FIGS. 1a to 1e.

The respective views of the FIGS. 1a to 1e also show whether the lens function on the above deflecting plane and the deflecting perpendicular plane is convex or concave.

Figure 1D:
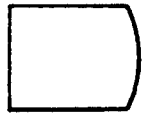
Figure 1D:
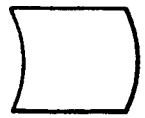
Figure 1D:
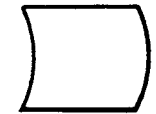
Figure 1D:
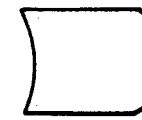
Figure 1E:
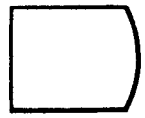
Figure 1E:
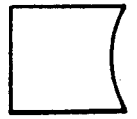
Figure 1E:
Figure 1E:
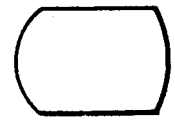

FIG. 1a shows the first fθ lens system, FIG. 1b the second fθ lens system, FIGS. 1c and 1d the third fθ lens system, and FIG. 1e shows the fourth fθ lens system.

The respective conditions mentioned above will next be further described.

First, the condition (I) as the common condition of the first to fourth fθ lens systems, i.e., the condition for the lateral magnification $\beta$ of a formed image of the fθ lens system, $$-9.15 < \beta < -2.20$$

has the following meaning. When the fθ lens system is constructed by the lens shape provided by the above common features with respect to the first to fourth lens systems, a curvature of a field can be preferably corrected in the main and secondary scanning directions by setting the value $\beta$ within a range satisfying the above condition.

Next, with respect to the condition (1-II), when the reflecting face inclination is corrected by the lens face construction of the first fθ lens system, the image forming position in the secondary scanning direction is greatly shifted from the scanned face toward the rotary polygon when the absolute value in the above condition (1-II) exceeds an upper value thereof, and is greatly shifted from the scanned face in the direction opposite to the rotary polygon when this absolute value exceeds a lower limit. Accordingly, in a case in which the condition (1-II) is not formed, the curvature of the field in the secondary scanning direction becomes excessively large.

When the face inclination is corrected by the lens face construction of the second fθ lens system, the image forming position in the secondary scanning direction is greatly shifted from the scanned face toward the rotary polygon when the absolute value in the above condition (2-II) exceeds a lower limit thereof, and is greatly shifted from the scanned face in the direction opposite to the rotary polygon when this absolute value exceeds an upper limit thereof. Therefore, a sufficient performance for forming the image cannot be obtained.

Similarly, when the face inclination is corrected by the lens face construction of the third fθ lens system, the image forming position in the secondary scanning direction is greatly shifted from the scanned face in the direction opposite to the rotary polygon when the absolute values in the above conditions (3-II) and (3-III) exceed lower limits thereof, and is greatly shifted from the scanned face in the direction opposite to the rotary polygon when these absolute values exceed upper limits thereof. Therefore, a sufficient performance for forming the image cannot be obtained.

When the face inclination is corrected by the lens face construction of the fourth fθ lens system, the curvature of the field in the secondary scanning direction is greatly caused in a range outside the range formed in the condition (4-II). Therefore, a sufficient performance for forming the image is not obtained.

Figure 2:
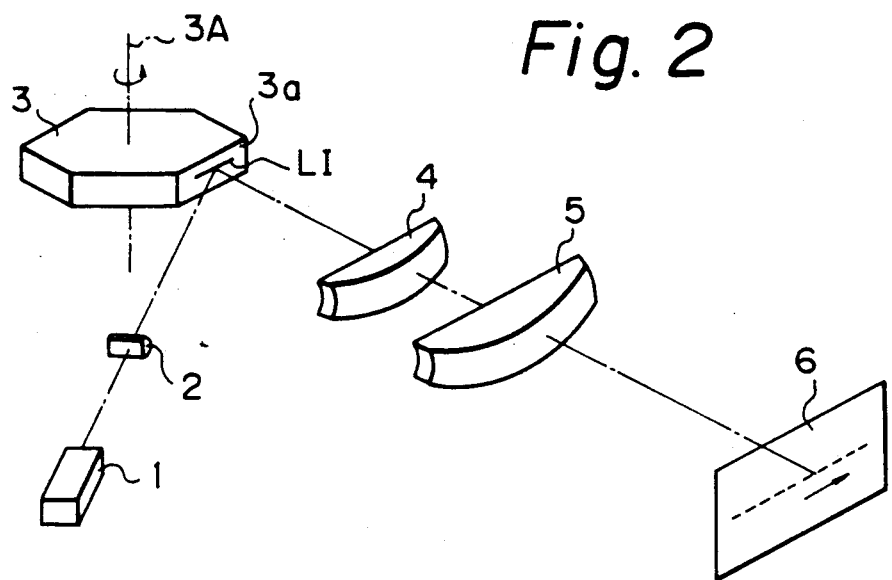
FIGS. 2 and 3 are views for explaining an optical scanner.
Figure 3:
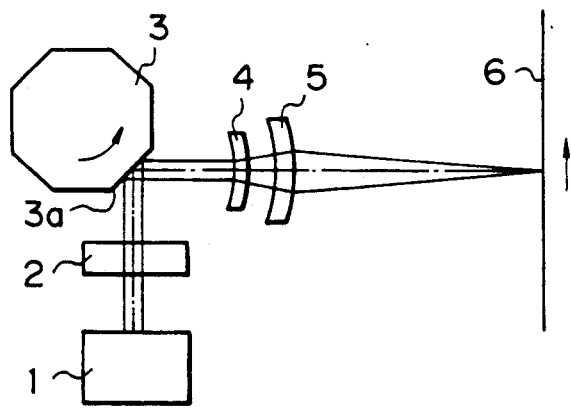

FIG. 2 schematically shows one example of an optical scanner using the fθ lens system. FIG. 3 shows a state of an optical arrangement of FIG. 2 seen from the secondary scanning direction, i.e., the situation of the optical arrangement on the deflecting plane.

A parallel light beam is emitted from a light source device 1 composed of a light source or the light source and a condenser, and is focused and formed by a cylindrical lens 2 constructing a line image forming optical system as a line image LI approximately parallel to a deflecting plane in the vicinity of a reflecting face 3a of a rotary polygon mirror 3. The longitudinal direction of this line image is a main scanning corresponding direction.

The light beam reflected by the rotary polygon mirror 3 is focused and formed by the fθ lens system in the shape of a spot on the scanned face 6. The scanned face 6 is scanned at an equal speed in accordance with the rotation at an equal speed in an arrow direction of the rotary polygon mirror 3.

Figure 4:
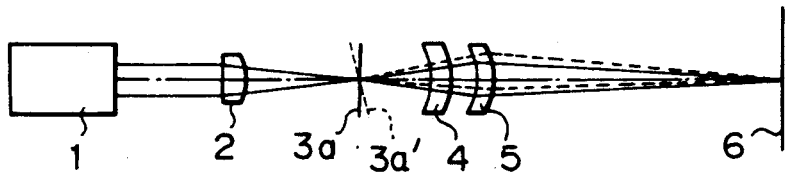
FIG. 4 is a view for explaining the correction of a reflecting face inclination.

The fθ lens system is constructed by a first lens 4 and a second lens 5 respectively disposed on the sides of the rotary polygon mirror 3 and the scanned face 6. As shown in FIG. 2, on the deflecting plane, the fθ lens system composed of the lenses 4 and 5 connects the infinity on the light source side to the position of the scanned face 6 in a conjugate relation. In contrast to this, on the deflecting perpendicular plane, i.e., with respect to the secondary scanning direction, the fθ lens system connects a reflecting position of the rotary polygon mirror 3 to the scanned face 6 in an approximately conjugate relation. Accordingly, as shown in FIG. 4, even when the reflecting face 3a is inclined as shown by reference numeral 3a', the image forming position on the scanned face 6 provided by the fθ lens system does not almost move in the secondary scanning direction (the upward and downward directions in FIG. 4), thereby correcting the inclination of the reflecting face.

Figure 5:
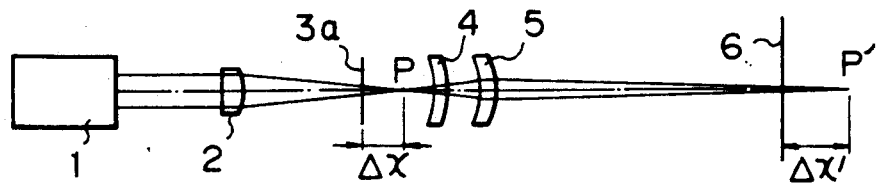
FIGS. 5 to 8 are views for explaining a condition for preferably realizing an optically scanning operation by a rotary polygon mirror.

When the rotary polygon mirror 3 is rotated, the reflecting face 3a is rotated around a shaft 3A. Therefore, as shown in FIG. 5, a position shift $\Delta X$ is caused between the image forming position P of the line image and the reflecting face 3a by the rotation of the reflecting face. Thus, a position P' of a conjugate image of the line image provided by the fθ lens system is shifted by $\Delta X'$ from the scanned face 6.

As is well known, this shift amount $\Delta X'$ is provided by $\Delta X' = \beta^2 \Delta X$ when a lateral magnification in the secondary scanning direction of the fθ lens system is $\beta$.

Figure 6:
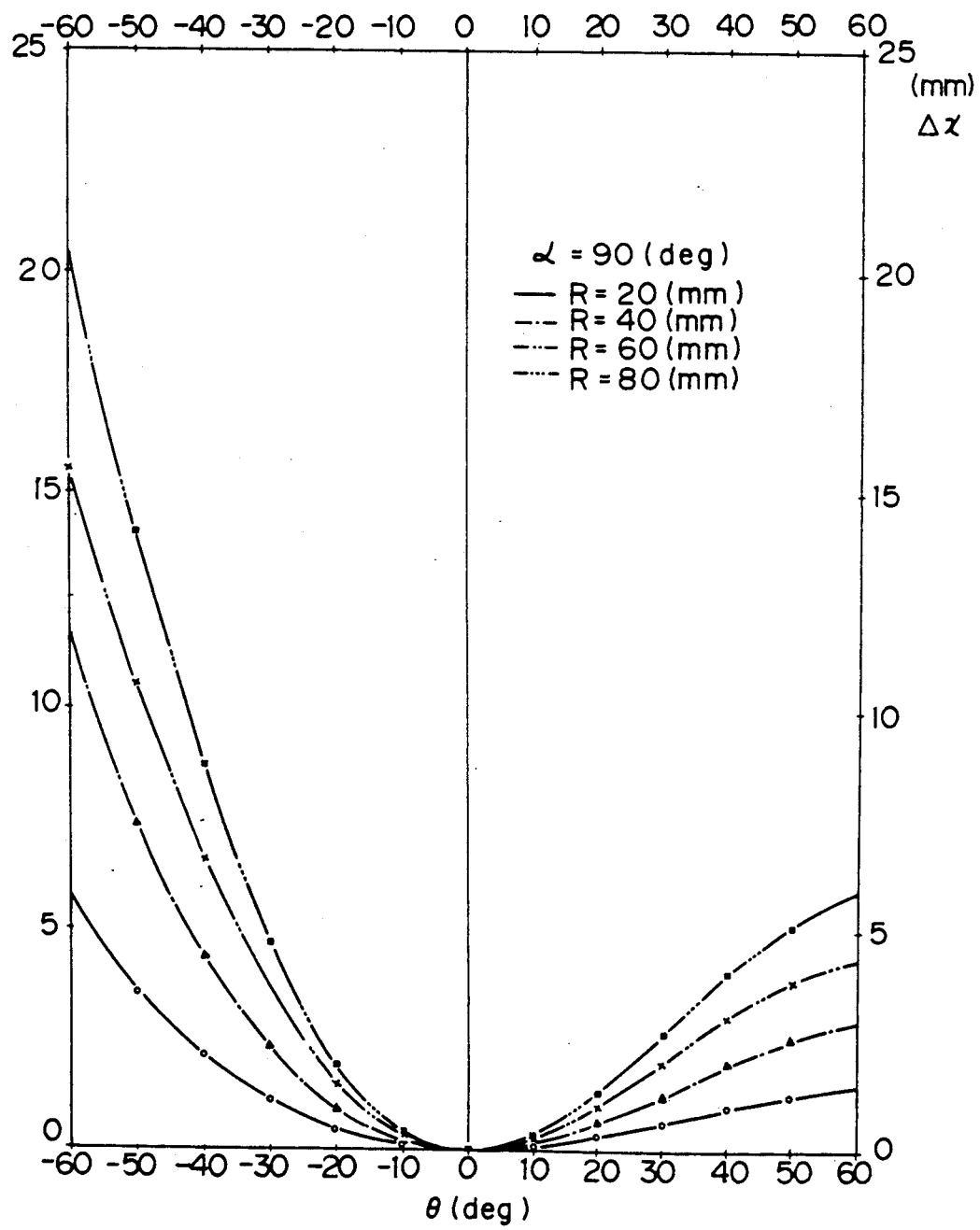
Figure 7:
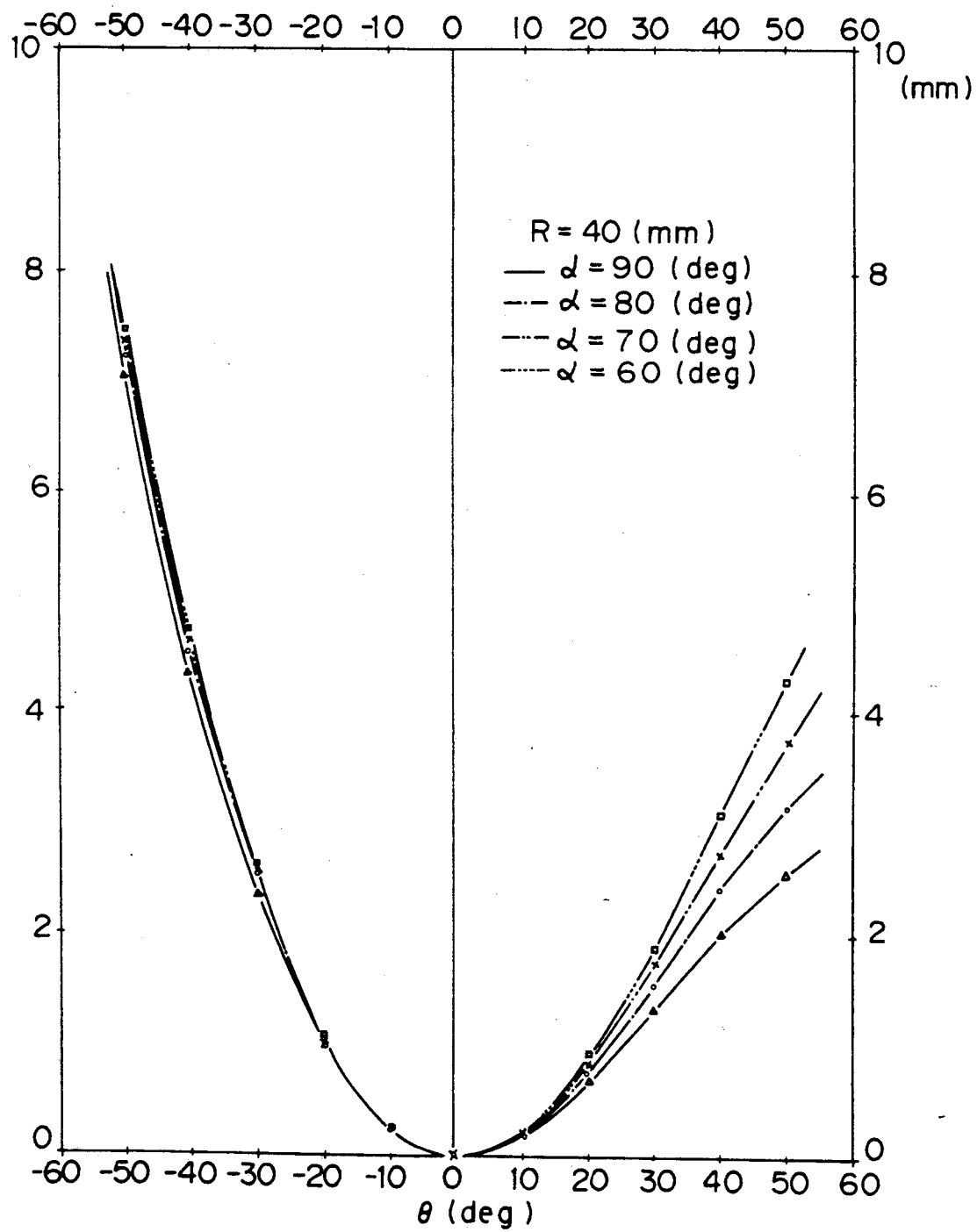

When an angle between a lens optical axis of the fθ lens system and a main deflected light beam is set to $\theta$ on the deflecting plane, the relation between the $\theta$ and the above $\Delta X$ is shown in FIGS. 6 and 7. FIG. 6 shows this relation when an incident angle $\alpha$ (see FIG. 8) is 90 degrees and a radius R of an inscribed circle of the rotary polygon mirror 3 is a parameter. FIG. 7 shows the above relation when the radius R of this inscribed circle is set to 40 mm and the incident angle $\alpha$ is a parameter.

As can be seen from FIGS. 6 and 7, the $\Delta X$ increases as the radius R of the inscribed circle increases and the incident angle $\alpha$ decreases.

The relative position shift between the position of the line image and the reflecting face by the rotation of the reflecting face is caused two-dimensionally on the deflecting plane and moves asymmetrically with respect to the lens optical axis.

Accordingly, in the optical scanner as shown in FIG. 2, it is necessary to preferably correct the curvature of the field in the main and secondary scanning directions of the fθ lens system. Further, the fθ characteristics must be preferably corrected with respect to the main scanning direction.

Figure 8:
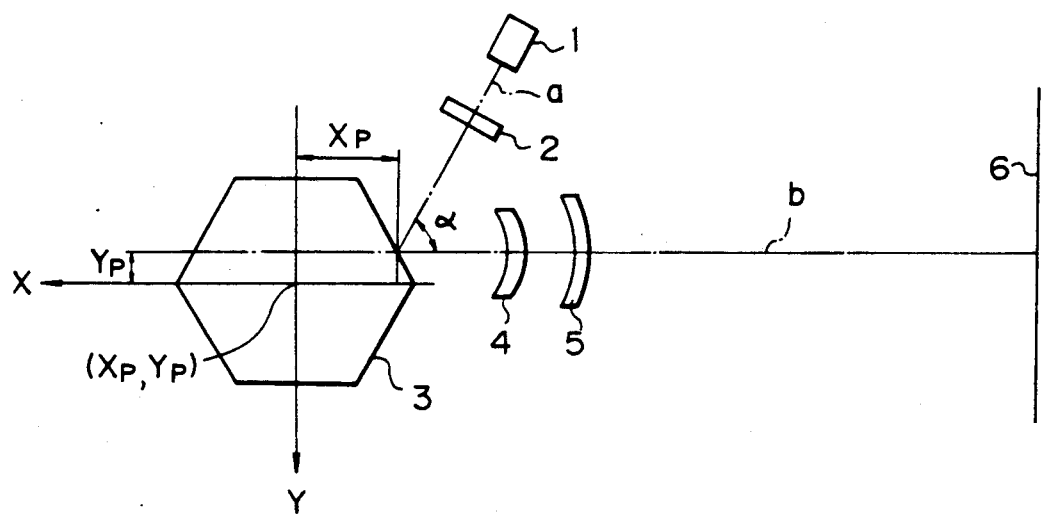

With respect to the above-mentioned incident angle α, in FIG. 8, reference numeral a designates a light beam on the optical axis incident onto the rotary polygon mirror, and reference numeral b designates a main light beam when the light beam reflected by the rotary polygon mirror 3 becomes parallel to the optical axis of the fθ lens system. The X and Y axes are determined as shown in FIG. 8 with an intersection point of the main light beams a and b as an origin. The position coordinates on a rotary axis of the rotary polygon mirror 3 are respectively set to $X_p$ and $Y_p$.

The incident angle α is defined as an intersection angle of the main light beams a and b as shown in FIG. 8.

As is well known, to reduce the change in position shift amount ΔX between the position of the line image and the reflecting face as much as possible, it is enough to set the following conditions with respect to the $X_p$ and $Y_p$, $$0 < X_p < R' \cos(\alpha/2)$$

$$0 < Y_p < R' \sin(\alpha/2)$$

when the radius of a circumscribed circle of the rotary polygon mirror is set to R'.

Further, to locate the incident light beam a on the optical axis outside an effective region such that a return light from the scanned face 6 is not incident again as a ghost light to a main scanning region on the scanned face, it is enough to set the following condition, $$\theta < \alpha < (4\pi/N) - \theta$$

with respect to the above angle α where the number of faces of the rotary polygon mirror 3 is N.

The concrete twenty embodiments of the present invention will next be described in detail in the following description.

In the respective embodiments, reference numeral $f_M$ shows a combined focal distance with respect to the main scanning direction of the fθ lens system, i.e., the combined focal distance on a plane parallel to the deflecting plane. This value $f_M$ is normalized to 100. Reference numeral $f_S$ shows a combined focal distance on the deflecting perpendicular plane, i.e., the combined focal distance with respect to the secondary scanning direction. Reference numerals 2θ, α and β respectively designate an effective deflecting angle (degrees), the above-mentioned incident angle (degrees) and the lateral magnification on the deflecting perpendicular plane.

Reference numeral $r_{iX}$ designates a radius of curvature of an i-th lens face on the deflecting plane counted from the side of the rotary polygon mirror, i.e., the radius of curvature of lens face shapes represented in the respective upper views shown as "main" in FIGS. 1a to 1e. Reference numeral $r_{iY}$ designates the radius of curvature of the i-th lens face on the deflecting perpendicular plane, i.e., the radius of curvature of lens face shapes represented in the respective lower views shown as "secondary" in FIGS. 1a to 1e. Reference numeral $d_i$ designates a distance between the i-th lens faces. Reference numeral $d_O$ designates a distance from the reflecting face of the rotary polygon mirror to the first lens face. Reference numeral $n_j$ designates a refractive index of a j-th lens.

Further, reference numerals $K_1$ and $K_2$ respectively designate parameters of the above conditions (1-II), (2-II), (3-II), (4-II) and (4-III) in accordance with any one of the first to fourth lens systems relating to the respective embodiments.

EMBODIMENT 1

$f_M = 100$, $f_S = 15.563$, $\beta = -4.049$, $K_1 = 0.309$, $\alpha = 54$, $2\theta = 60$, $d_o = 5.411$

| i | $r_{iX}$ | $r_{iY}$ | $d_i$ | j | $n_j$ |
|---|---|---|---|---|---|
| 1 | ∞ | −4.810 | 1.509 | 1 | 1.71221 |
| 2 | −954.926 | −954.926 | 7.245 | | |
| 3 | −36.528 | −36.528 | 4.638 | 2 | 1.67500 |
| 4 | −25.488 | −7.276 | | | |

FIGS. 9a, 9b and 9c respectively show an aberration diagram, a diagram showing a curvature of field and an fθ characteristic graph with respect to the embodiment 1. The curvature of field is shown in relation to the rotation of the rotary polygon mirror and a broken line shows the curvature of field in the main scanning direction and a solid line shows that in the secondary scanning direction. The fθ characteristics are defined by $(h-f_M\theta)100/(f_M\theta)$ when the height of an ideal image is $f_M\theta$ and the height of the real image is h.

EMBODIMENT 2

$f_M = 100$, $f_S = 15.529$, $\beta = -3.976$, $K_1 = 0.294$, $\alpha = 54$, $2\theta = 60$, $d_o = 5.411$

| i | $r_{iX}$ | $r_{iY}$ | $d_i$ | j | $n_j$ |
|---|---|---|---|---|---|
| 1 | ∞ | −4.569 | 1.509 | 1 | 1.71221 |
| 2 | −954.926 | −954.926 | 7.245 | | |
| 3 | −36.528 | −36.528 | 4.638 | 2 | 1.67500 |
| 4 | −24.488 | −7.276 | | | |

FIGS. 10a, 10b and 10c respectively show an aberration diagram, a diagram of a curvature of field and an fθ charateristic graph with respect to the embodiment 2.

EMBODIMENT 3

$f_M = 100$, $f_S = 15.172$, $\beta = -3.586$, $K_1 = 0.238$, $\alpha = 54$, $2\theta = 60$, $d_o = 5.411$

| i | $r_{iX}$ | $r_{iY}$ | $d_i$ | j | $n_j$ |
|---|---|---|---|---|---|
| 1 | ∞ | −3.607 | 1.509 | 1 | 1.71221 |
| 2 | −954.926 | −954.926 | 7.245 | | |
| 3 | −36.528 | −36.528 | 4.638 | 2 | 1.67500 |
| 4 | −24.488 | −7.121 | | | |

FIGS. 11a, 11b and 11c respectively show an aberration diagram, a diagram of a curvature of field and an fθ characteristic graph with respect to the embodiment 3.

EMBODIMENT 4

$f_M = 100$, $f_S = 15.616$, $\beta = -4.212$, $K_1 = 0.347$, $\alpha = 54$, $2\theta = 60$, $d_o = 5.411$

| i | $r_{iX}$ | $r_{iY}$ | $d_i$ | j | $n_j$ |
|---|---|---|---|---|---|
| 1 | ∞ | −5.411 | 1.509 | 1 | 1.71221 |
| 2 | −954.926 | −954.926 | 7.245 | | |
| 3 | −36.528 | −36.528 | 4.638 | 2 | 1.67500 |
| 4 | −24.488 | −7.334 | | | |

FIGS. 12a, 12b and 12c respectively show an aberration diagram, a diagram of a curvature of field and an fθ characteristic graph with respect to the embodiment 4.

EMBODIMENT 5

$f_M = 100$, $f_S = 15.636$, $\beta = -4.352$, $K_1 = 0.385$, $\alpha = 54$, $2\theta = 60$, $d_o = 5.411$

| i | $r_{iX}$ | $r_{iY}$ | $d_i$ | j | $n_j$ |
|---|---|---|---|---|---|
| 1 | ∞ | −6.012 | 1.509 | 1 | 1.71221 |
| 2 | −954.926 | −954.926 | 7.245 | | |
| 3 | −36.528 | −36.528 | 4.638 | 2 | 1.67500 |
| 4 | −24.488 | −7.386 | | | |

FIGS. 13a, 13b and 13c respectively show an aberration diagram, a diagram of a curvature of field and an fθ characteristic graph with respect to the embodiment 5.

EMBODIMENT 6

$f_M = 100$, $f_S = 16.113$, $\beta = -5.444$, $K_1 = 1.642$, $\alpha = 54$, $2\theta = 60.8$, $d_o = 9.019$

| i | $r_{iX}$ | $r_{iY}$ | $d_i$ | j | $n_j$ |
|---|---|---|---|---|---|
| 1 | ∞ | −26.455 | 3.716 | 1 | 1.71221 |
| 2 | −478.035 | −478.035 | 0.602 | | |
| 3 | −40.655 | −40.655 | 8.779 | 2 | 1.67500 |
| 4 | −28.998 | −8.338 | | | |

FIGS. 14a, 14b and 14c respectively show an aberration diagram, a diagram of a curvature of field and an fθ characteristic graph with respect to the embodiment 6.

EMBODIMENT 7

$f_M = 100$, $f_S = 16.154$, $\beta = -5.331$, $K_1 = 1.489$, $\alpha = 54$, $2\theta = 60.8$, $d_o = 9.019$

| i | $r_{iX}$ | $r_{iY}$ | $d_i$ | j | $n_j$ |
|---|---|---|---|---|---|
| 1 | ∞ | −24.050 | 3.716 | 1 | 1.71221 |
| 2 | −478.035 | −478.035 | 0.602 | | |
| 3 | −40.655 | −40.655 | 8.779 | 2 | 1.67500 |
| 4 | −28.998 | −8.272 | | | |

FIGS. 15a, 15b and 15c respectively show an aberration diagram, a diagram of a curvature of field and an fθ characteristic graph with respect to the embodiment 7.

EMBODIMENT 8

$f_M = 100$, $f_S = 16.058$, $\beta = -5.508$, $K_1 = 1.797$, $\alpha = 54$, $2\theta = 60.8$, $d_o = 9.019$

| i | $r_{iX}$ | $r_{iY}$ | $d_i$ | j | $n_j$ |
|---|---|---|---|---|---|
| 1 | ∞ | −28.860 | 3.716 | 1 | 1.71221 |
| 2 | −478.035 | −478.035 | 0.602 | | |
| 3 | −40.655 | −40.655 | 8.779 | 2 | 1.67500 |

-continued

| i | $r_{iX}$ | $r_{iY}$ | $d_i$ | j | $n_j$ |
|---|---|---|---|---|---|
| 4 | −28.998 | −8.389 | | | |

FIGS. 16a, 16b and 16c respectively show an aberration diagram, a diagram of a curvature of field and an fθ characteristic graph with respect to the embodiment 8.

EMBODIMENT 9

$f_M = 100$, $f_S = 16.029$, $\beta = -5.529$, $K_1 = 1.876$, $\alpha = 54$, $2\theta = 60.8$, $d_o = 9.019$

| i | $r_{iX}$ | $r_{iY}$ | $d_i$ | j | $n_j$ |
|---|---|---|---|---|---|
| 1 | ∞ | −30.062 | 3.716 | 1 | 1.71221 |
| 2 | −478.035 | −478.035 | 0.602 | | |
| 3 | −40.655 | −40.655 | 8.779 | 2 | 1.67500 |
| 4 | −28.998 | −8.411 | | | |

FIGS. 17a, 17b and 17c respectively show an aberration diagram, a diagram of a curvature of field and an fθ characteristic graph with respect to the embodiment 9.

EMBODIMENT 10

$f_M = 100$, $f_S = 14.263$, $\beta = -6.184$, $K_1 = 1.307$, $\alpha = 54$, $2\theta = 60.4$, $d_o = 7.816$

| i | $r_{iX}$ | $r_{iY}$ | $d_i$ | j | $n_j$ |
|---|---|---|---|---|---|
| 1 | ∞ | −18.639 | 3.367 | 1 | 1.71221 |
| 2 | −623.550 | −623.550 | 1.202 | | |
| 3 | −36.796 | −36.796 | 6.012 | 2 | 1.67500 |
| 4 | −26.335 | −7.013 | | | |

FIGS. 18a, 18b and 18c respectively show an aberration diagram, a diagram of a curvature of field and an fθ characteristic graph with respect to the embodiment 10.

In these embodiments 1 to 10, the lens shapes on a deflecting plane and a plane perpendicular to this deflecting plane are shown in FIG. 1a.

Next, embodiments 11 to 13 of the second fθ lens system are as follows.

EMBODIMENT 11

$f_M = 100$, $f_S = 13.946$, $\beta = -6.464$, $K_1 = 0.121$, $\alpha = 54$, $2\theta = 60.4$, $d_o = 7.816$

| i | $r_{iX}$ | $r_{iY}$ | $d_i$ | j | $n_j$ |
|---|---|---|---|---|---|
| 1 | ∞ | ∞ | 3.367 | 1 | 1.71221 |
| 2 | −623.550 | 27.898 | 1.202 | | |
| 3 | −36.796 | −36.796 | 6.012 | 2 | 1.67500 |
| 4 | −26.335 | −6.917 | | | |

FIGS. 19a, 19b and 19c respectively show an aberration diagram, a diagram of a curvature of field and an fθ characteristic graph with respect to the embodiment 11.

EMBODIMENT 12

$f_M = 100$, $f_S = 13.912$, $\beta = -6.553$, $K_1 = 0.081$, $\alpha = 54$, $2\theta = 60.4$, $d_o = 7.816$

| i | $r_{iX}$ | $r_{iY}$ | $d_i$ | j | $n_j$ |
|---|---|---|---|---|---|
| 1 | ∞ | ∞ | 3.367 | 1 | 1.71221 |
| 2 | −623.550 | 30.303 | 1.202 | | |
| 3 | −36.796 | −36.796 | 6.012 | 2 | 1.67500 |

-continued

| i | $r_iX$ | $r_iY$ | $d_i$ | j | $n_i$ |
|---|--------|--------|-------|---|-------|
| 4 | −26.335 | −6.974 | | | |

FIGS. 20a, 20b and 20c respectively show an aberration diagram, a diagram of a curvature of field and an $f\theta$ characteristic graph with respect to the embodiment 12.

EMBODIMENT 13

$f_M = 100$, $f_S = 13.987$, $\beta = -6.316$, $K_1 = 0.179$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | ∞ | 3.367 | 1 | 1.71221 |
| 2 | −623.550 | 25.012 | 1.202 | | |
| 3 | −36.796 | −36.796 | 6.012 | 2 | 1.67500 |
| 4 | −26.335 | −6.836 | | | |

FIGS. 21a, 21b and 21c respectively show an aberration diagram, a diagram of a curvature of field and an $f\theta$ characteristic graph with respect to the embodiment 13.

In these embodiments 11 to 13, the lens shapes on a deflecting plane and a plane perpendicular to this deflecting plane are shown in FIG. 1b.

Next, embodiments 14 to 17 of the third $f\theta$ lens system are as follows.

EMBODIMENT 14

$f_M = 100$, $f_S = 14.425$, $\beta = -5.988$, $K_1 = 0.834$, $K_2 = 3.585$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | −12.025 | 3.367 | 1 | 1.71221 |
| 2 | −623.550 | −51.707 | 1.202 | | |
| 3 | −36.796 | −36.796 | 6.012 | 2 | 1.67500 |
| 4 | −26.335 | −7.038 | | | |

FIGS. 22a, 22b and 22c respectively show an aberration diagram, a diagram of a curvature of field and an $f\theta$ characteristic graph with respect to the embodiment 14.

EMBODIMENT 15

$f_M = 100$, $f_S = 14.182$, $\beta = -6.260$, $K_1 = 1.458$, $K_2 = 58.302$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | −20.683 | 3.367 | 1 | 1.71221 |
| 2 | −623.550 | −826.833 | 1.202 | | |
| 3 | −36.796 | −36.796 | 6.012 | 2 | 1.67500 |
| 4 | −26.335 | −7.063 | | | |

FIGS. 23a, 23b and 23c respectively show an aberration diagram, a diagram of a curvature of field and an $f\theta$ characteristic graph with respect to the embodiment 15.

EMBODIMENT 16

$f_M = 100$, $f_S = 15.455$, $\beta = -4.991$, $K_1 = 0.233$, $K_2 = 0.630$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | −3.607 | 3.367 | 1 | 1.71221 |
| 2 | −623.550 | −9.740 | 1.202 | | |
| 3 | −36.796 | −36.796 | 6.012 | 2 | 1.67500 |

-continued

| i | $r_iX$ | $r_iY$ | $d_i$ | j | $n_i$ |
|---|--------|--------|-------|---|-------|
| 4 | −26.335 | −6.983 | | | |

FIGS. 24a, 24b and 24c respectively show an aberration diagram, a diagram of a curvature of field and an $f\theta$ characteristic graph with respect to the embodiment 16.

EMBODIMENT 17

$f_M = 100$, $f_S = 13.848$, $\beta = -2.204$, $K_1 = 0.052$, $K_2 = 0.307$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | −0.721 | 3.367 | 1 | 1.71221 |
| 2 | −623.550 | −4.245 | 1.202 | | |
| 3 | −36.796 | −36.796 | 6.012 | 2 | 1.67500 |
| 4 | −26.335 | −5.929 | | | |

FIGS. 25a, 25b and 25c respectively show an aberration diagram, a diagram of a curvature of field and an $f\theta$ characteristic graph with respect to the embodiment 17.

In these embodiments 14, 16 and 17, the lens shapes on a deflecting plane and a plane perpendicular to this deflecting plane are shown in FIG. 1c. In the embodiment 15, the lens shapes on a deflecting plane and a plane perpendicular to this deflecting plane are shown in FIG. 1d.

Next, embodiments 18 to 20 of the fourth $f\theta$ lens system are as follows.

EMBODIMENT 18

$f_M = 100$, $f_S = 11.545$, $\beta = -8.628$, $K_1 = 4.207$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | ∞ | 3.367 | 1 | 1.71221 |
| 2 | −623.550 | 8.658 | 1.202 | | |
| 3 | −36.796 | 5.059 | 6.012 | 2 | 1.67500 |
| 4 | −26.335 | −26.335 | | | |

FIGS. 26a, 26b and 26c respectively show an aberration diagram, a diagram of a curvature of field and an $f\theta$ characteristic graph with respect to the embodiment 18.

EMBODIMENT 19

$f_M = 100$, $f_S = 12.197$, $\beta = -8.402$, $K_1 = 9.026$, $\alpha = 54$, $2\theta = 60.8$, $d_o = 9.019$

| i | $r_iX$ | $r_iY$ | $d_i$ | j | $n_i$ |
|---|--------|--------|-------|---|-------|
| 1 | ∞ | ∞ | 3.716 | 1 | 1.71221 |
| 2 | −478.035 | 11.303 | 0.602 | | |
| 3 | −40.655 | 5.437 | 8.779 | 2 | 1.67500 |
| 4 | −28.998 | −28.998 | | | |

FIGS. 27a, 27b and 27c respectively show an aberration diagram, a diagram of a curvature of field and an $f\theta$ characteristic graph with respect to the embodiment 19.

EMBODIMENT 20

$f_M = 100$, $f_S = 11.485$, $\beta = -9.149$, $K_1 = 4.551$, $\alpha = 54$, $2\theta = 60.4$, $d_o = 7.816$

| i | $r_iX$ | $r_iY$ | $d_i$ | j | $n_i$ |
|---|--------|--------|-------|---|-------|
| 1 | ∞ | ∞ | 3.367 | 1 | 1.71221 |

-continued

| i | $r_iX$ | $r_iY$ | $d_i$ | j | $n_i$ |
|---|--------|--------|-------|---|-------|
| 2 | −623.550 | 10.462 | 1.202 | | |
| 3 | −36.796 | 5.473 | 6.012 | 2 | 1.67500 |
| 4 | −26.335 | −26.335 | | | |

FIGS. 28a, 28b and 28c respectively show an aberration diagram, a diagram of a curvature of field and an fθ characteristic graph with respect to the embodiment 20.

In these embodiments 18 to 20, the lens shapes on a deflecting plane and a plane perpendicular to this deflecting plane are shown in FIG. 1e.

The fθ characteristic value is relatively large in the above-mentioned embodiments, but it is possible to sufficiently correct the fθ characteristic value electrically in any embodiment.

In the embodiments 1 to 17 relating to the first to third fθ lens systems, the curvature of the field is corrected very well in both the main and secondary scanning directions. In comparison with these embodiments, the curvature of the field in the secondary scanning direction is slightly large in the embodiments 18 to 20 relating to the fourth fθ lens system. However, in this case, the curvature of the field in the secondary scanning direction can be corrected by a correcting technique by the movement of a light source disclosed in Japanese Patent Application Laying Open (KOKAI) Nos. 62-129814 and 57-14820, i.e., by displacing the light source in the optical axis direction according to the main scanning operation to displace the position of the linear image.

Further, in the fourth fθ lens system, the lateral magnification β of the formed image with respect to the line image is large and the amount Δ X can be reduced. Therefore, it is easy to practically use the technique for correcting the curvature of the field in the secondary scanning direction by the vibrational displacement of the light source device disclosed in the respective Japanese Laid-Open publications mentioned above.

The above embodiments 18 and 19 are assumed to be provided when the reciprocating operation of such a displacement of the light source is performed twice every one main scanning operation to correct the curvature of the field in the secondary scanning direction. The embodiment 20 is assumed to be provided when the reciprocating operation of such a displacement of the light source is performed once every one main scanning operation to correct the curvature of the field in the secondary scanning direction.

As mentioned above, the present invention can provide a novel fθ lens system in the optical scanner.

This fθ lens system is constructed as mentioned above so that it is possible to perform the optically scanning operation of high density and preferably correct the inclination of the reflecting face.

Many widely different embodiments of the present invention may be constructed without departing from the spirit and scope of the present invention. It should be understood that the present invention is not limited to the specific embodiments described in the specification, except as defined in the appended claims.

What is claimed is:

1. An fθ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation with respect to a secondary scanning direction, and having an fθ function for moving the deflected scanning light beam on a scanned medium face at an approximately equal speed with respect to a main scanning direction, said fθ lens system comprising two groups of first and second lenses sequentially arranged from the side of the rotary polygon mirror toward the scanned face side, a lateral magnification of the formed image on the scanned face with respect to said line image in the secondary scanning direction being provided in a range of −9.15 to −2.20, said lenses having first to fourth lens faces provided from the side of said rotary polygon mirror and having shapes on a deflecting plane sequentially composed of a straight line, an arc, an arc and an arc from the first to fourth lens faces, said first and second lenses having a positive refracting power on a plane parallel to the deflecting plane, said first to fourth lens facing being respectively constructed by a concave cylindrical face having a refracting power on only a deflecting perpendicular plane, a convex spherical face, a concave spherical face and a toric face having a large curvature on the deflecting perpendicular plane, a combined focal distance $f_S$ on the deflecting perpendicular plane and the radius $r'_1$ of curvature of the first lens face on the deflecting perpendicular plane satisfying the following condition, $$0.23 \leq |r'_1/f_S| \leq 1.88.$$

2. An fθ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face, said fθ lens system focusing and forming the light beam deflected by the rotary polygon mirror as an image on the scanned face, said fθ lens system having a function for connecting a reflecting position of the rotary polygon mirror and the scanned face in an approximately conjugate relation with respect to a secondary scanning direction, and having an fθ function for moving the deflected scanning light beam on a scanned medium face at an approximately equal speed with respect to a main scanning direction, said fθ lens system comprising two groups of first and second lenses sequentially arranged from the side of the rotary polygon mirror toward the scanned face side, a lateral magnification of the formed image on the scanned face with respect to said line image in the secondary scanning direction being provided in a range of −9.15 to −2.20, said lenses having first to fourth lens faces provided from the side of said rotary polygon mirror and having shapes on a deflecting plane sequentially composed of a straight line, an arc, an arc and an arc from the first to fourth lens faces, said first and second lenses having a positive refracting power on a plane parallel to the deflecting plane, said first to fourth lens faces being respectively constructed by a planar face, a toric face having a large curvature on a deflecting perpendicular plane, a concave spherical face and a toric face having a large curvature on the deflecting perpendicular plane, a combined focal distance $f_S$ on the deflecting perpendicular plane and the radii $r'_2$ and $r'_3$ of curvature of the second and third lens faces on the deflecting perpendicular plane satisfying the following condition, $$0.08 \leq |\{(1/r'_2)+(1/r'_3)\} \cdot f_S| \leq 0.18.$$

3. An $f\theta$ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by an image forming lens system in the shape of a spot on a scanned face to optically scan the scanned face, said $f\theta$ lens system focusing and forming the light beam deflected by the rotary polygon mirror as an image on the scanned face, said $f\theta$ lens system having a function for connecting a reflecting position of the rotary polygon mirror and the scanned face in an approximately conjugate relation with respect to a secondary scanning direction, and having an $f\theta$ function for moving the deflected scanning light beam on a scanned medium face at an approximately equal speed with respect to a main scanning direction, said $f\theta$ lens system comprising two groups of first and second lenses sequentially arranged from the side of the rotary polygon mirror toward the scanned face side, a lateral magnification of the formed image on the scanned face with respect to said line image in the secondary scanning direction being provided in a range of $-9.15$ to $-2.20$, said lenses having first to fourth lens faces provided from the side of said rotary polygon mirror and having shapes on a deflecting plane sequentially composed of a straight line, an arc, an arc and an arc from the first to fourth lens faces, said first and second lenses having a positive refracting power on a plane parallel to the deflecting plane, said first to fourth lens faces being respectively constructed by a concave cylindrical face having a refracting power on only a deflecting perpendicular plane, a toric face having a large curvature on the deflecting perpendicular plane, a concave spherical face, and a toric face having a large curvature on the deflecting perpendicular plane, a combined focal distance $f_S$ on the deflecting perpendicular plane and the radii $r'_1$ and $r'_2$ of curvature of the first and second lens faces on the deflecting perpendicular plane satisfying the following conditions.

$$0.05 \leq |r'_1/f_S| \leq 1.46$$

$$0.3 \leq |r'_2/f_S| \leq 58.3.$$

4. An $f\theta$ lens system in an optical scanner in which a light beam from a light source is formed as a line image extending in a main scanning corresponding direction and is deflected at an equiangular velocity by a rotary polygon mirror having a reflecting face in the vicinity of an image forming position of the line image and is then formed by a image forming lens system in the shape of a spot on a scanned face to optically scan the scanned face, said $f\theta$ lens system focusing and forming the light beam deflected by the rotary polygon mirror as an image on the scanned face, said $f\theta$ lens system having a function for connecting a reflecting position of the rotary polygon mirror and the scanned face in an approximately conjugate relation with respect to a secondary scanning direction, and having an $f\theta$ function for moving the deflected scanning light beam on a scanned medium face at an approximately equal speed with respect to a main scanning direction, said $f\theta$ lens system comprising two groups of first and second lenses sequentially arranged from the side of the rotary polygon mirror toward the scanned face side, a lateral magnification of the formed image on the scanned face with respect to said line image in the secondary scanning direction being provided in a range of $-9.15$ to $-2.20$, said lenses having first to fourth lens faces provided from the side of said rotary polygon mirror and having shapes on a deflecting plane sequentially composed of a straight line, an arc, an arc and an arc from the first to fourth lens faces, said first and second lenses having a positive refracting power on a plane parallel to the deflecting plane, said first to fourth lens faces being respectively constructed by a planar face, a toric face having a large curvature on a deflecting perpendicular plane, a toric face having a large curvature on the deflecting perpendicular plane and a convex spherical face, a radius $r'_3$ of curvature of the third lens face on the deflecting perpendicular plane and the distance $d_2$ between the first and second lenses satisfying the following condition, $$4.2 \leq |r'_3/d_2| \leq 9.03.$$

* * * * *